(12) United States Patent
Kawamoto et al.

(10) Patent No.: US 6,694,836 B2
(45) Date of Patent: Feb. 24, 2004

(54) ALL-TERRAIN VEHICLE

(75) Inventors: Yuichi Kawamoto, Akashi (JP); Kiyohito Takano, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 68 days.

(21) Appl. No.: 10/051,083

(22) Filed: Jan. 22, 2002

(65) Prior Publication Data

US 2002/0096386 A1 Jul. 25, 2002

(30) Foreign Application Priority Data

Jan. 24, 2001 (JP) ........................................ 2001-015885
Jan. 29, 2001 (JP) ........................................ 2001-020064

(51) Int. Cl.⁷ ............................................... F16H 3/08
(52) U.S. Cl. ........................................ 74/371; 180/908
(58) Field of Search .................... 74/369, 371, 606 R; 180/908, 344, 350, 356, 354, 361, 364, 366, 373

(56) References Cited

U.S. PATENT DOCUMENTS 4,600,074 A * 7/1986 Watanabe et al. ........... 180/251
4,704,920 A * 11/1987 Kurata ................... 74/665 GC
4,771,636 A * 9/1988 Fujita .......................... 74/371
6,296,073 B1 * 10/2001 Rioux et al. ................. 180/292
6,571,904 B2 * 6/2003 Izumi .......................... 180/366

FOREIGN PATENT DOCUMENTS

| JP | 62-106162 A | 5/1987 |
| JP | 62-106162 | 5/1987 |
| JP | U 1-144557 | 10/1989 |
| JP | A 2-25868 | 1/1990 |
| JP | A 8-29438 | 2/1996 |
| JP | 2525574 B2 | 5/1996 |
| JP | A 8-220121 | 8/1996 |
| JP | A 8-262049 | 10/1996 |
| JP | A 8-318836 | 12/1996 |
| JP | A 9-109969 | 4/1997 |
| JP | A 10-48234 | 2/1998 |
| JP | 11-183499 A | 7/1999 |
| JP | 11-183499 | 7/1999 |

* cited by examiner

*Primary Examiner*—Dirk Wright
(74) *Attorney, Agent, or Firm*—Oliff & Berridge, PLC

(57) ABSTRACT

An all-terrain vehicle includes a variable-speed V-belt drive disposed on one side of a crankcase of an engine, a V-belt drive cover covering the variable-speed V-belt drive, a gear transmission of transmitting a power of the engine in cooperation with the variable-speed V-belt drive, and a speed sensing device. The speed sensing device includes a speed sensor of measuring a rotating speed of a member which transmits the power of the engine to the wheels. The speed sensor is disposed right under the V-belt drive cover.

3 Claims, 9 Drawing Sheets

ALL-TERRAIN VEHICLE

BACKGROUND OF THE INVENTION

1. Field of the Invention

The present invention relates to an all-terrain vehicle with a speed sensing device. Moreover, the present invention relates to an all-terrain vehicle with a gear transmission.

2. Description of the Related Art

Construction of a four-wheeled all-terrain vehicle and a power train for the four-wheeled all-terrain vehicle will be briefly described. The four-wheeled all-terrain vehicle has a body frame, a pair of front wheels and a pair of rear wheels supported on the body frame, an engine mounted on a part of the body frame between the front and the rear wheels, and steps disposed on the right and the left side of the engine, respectively. A handlebar is supported on an upper part of the body frame, and a straddle-type seat is disposed behind the handlebar. A speed meter (speed indicating device) is held on a middle part of the handlebar. Levers including a brake lever are disposed near the grips of the handlebar.

A crankcase of the engine extends rearward, and a transmission case is joined to the rear end of the crankcase. A gear transmission is built in the transmission case. A variable-speed V-belt drive is disposed on the right side of the crankcase. The output power of the engine is transmitted through the variable-speed V-belt drive to the gear transmission.

A drive shaft is extended in the back-and-forth direction under the transmission case. The drive shaft has a front end connected to a front propeller shaft, and a rear end connected to a rear propeller shaft. The front propeller shaft has a front end part interlocked with a front reduction gear built in a front reduction gear case. The rear propeller shaft has a rear end part interlocked with a rear reduction gear built in a rear reduction gear case.

In the four-wheeled all-terrain vehicle of this type, a conventional speed sensor is placed in a rear axle supporting part of the rear reduction gear case (axle case) and measures the rotation of a rear axle.

Mechanical speed sensors and electric speed sensors are available as a speed sensor of a vehicle. The mechanical speed sensor has a cable or a rod, a gear attached to the cable or the rod and engaged with a gear attached to a rotating member. The cable or the rod, and the gear attached to the same serve as a speed signal transmitting mechanism. The electric speed sensing device has a rotor connected to a rotating member, converts the rotation of the rotor into a corresponding electric pulse signal, and gives the electric pulse signal through a signal line to the speed indicating device.

Referring to FIG. 8 showing a related art speed sensing device disclosed in JP-A 183499/1999 for a vehicle, the speed sensing device 500 is attached to a right side wall of a rear reduction gear case 522 included in an all-terrain vehicle. The speed sensing device 500 has a screw gear 501 supported coaxially with a rear axle 522*a* for rotation together with the rear axle 522*a*, a pinion 503 supported for rotation and engaged with the screw gear 501. The rotation of the pinion 503 is measured and a speed signal corresponding to the rotating speed of the pinion 503 is sent through a harness 510 to a speed meter.

When the speed sensing device 500 is attached to the rear reduction gear case 522 as shown in FIG. 8, the speed sensing device 500 is splashed with mud and water while the vehicle is traveling. Since the speed sensing device 500 is distant from the speed meter disposed in a front part of the body frame of the vehicle, and the harness 510 is long, much time and great effort for wiring are required, and the harness 510 must be protected with a cover.

A conventional gear transmission for an all-terrain vehicle includes a chain transmission mechanism as a reversing transmission mechanism interposed between a transmission input shaft and a counter shaft. As shown in FIG. 9, a transmission input shaft 402 connected to a driven shaft 401 included in a variable-speed V-belt drive, a counter shaft (intermediate shaft) 403 and a transmission output shaft 404 are extended in parallel to each other and are supported in a transmission case 400. A forward high-seed gear 405, a forward low-speed gear 406 and a small reverse sprocket 407 are mounted on the transmission input shaft 402. Forward intermediate gears 410 and 411 respectively engaged with the forward gears 405 and 406, an intermediate output gear 413 and a large reverse sprocket 412 are mounted on the counter shaft 403. A chain 415 is extended between the sprockets 407 and 412. An output gear 416 engaged with the intermediate output gear 413, and a bevel gear 422 engaged with a bevel gear 421 mounted on a drive shaft 420 are mounted on the output shaft 404.

A shift dog clutch has a first shift sleeve 425 and a second shift sleeve 426 mounted on the counter shaft 403. The first shift sleeve 425 is interposed between the reverse sprocket 412 and the forward high-speed intermediate gear 410. The second shift sleeve 426 is disposed near the forward low-speed intermediate gear 411.

A shift rod 430 is provided with a first shift arm 431A and a second shift arm 431B respectively engaged with the shift sleeves 425 and 426.

When setting the gear transmission shown in FIG. 9 for a forward high speed or a reverse, the first shift sleeve 425 is shifted. On the other hand, when setting the gear transmission for a forward low speed, the second shift sleeve 426 is shifted. Techniques relating to the present invention are disclosed in JP-A 106162/1987.

Another known gear transmission is not provided with any chain transmission mechanism like that mentioned above, and is provided with a transmission input shaft, a counter shaft and a reverse idle shaft disposed between the transmission input shaft and the counter shaft, and drives an output shaft in the reverse direction by a gear for going backward.

However, those conventional gear transmissions for all-terrain vehicles have the following problems.

(1) Although the gear transmission shown in FIG. 9 including the chain transmission mechanism as a reversing transmission mechanism does not need a reversing idle shaft as an intermediate shaft, the transmission case 400 must be wide because the chain 415 must be a wide one to transmit a large torque, and the chain transmission mechanism requires much assembling work.

(2) In some cases, the chain transmission mechanism needs a tensioner to prevent the generation of rattling noise due to the elongation of the chain 415.

(3) The gear transmission provided with the reverse idle shaft as an intermediate shaft and not provided with any chain transmission needs an additional shaft and hence the transmission case is large and the gear transmission has complicated construction.

SUMMARY OF THE INVENTION

Accordingly, it is an object of the present invention to provide an all-terrain vehicle with a speed sensing device capable of being easily protected from mud, water and stones, of being connected to a speed meter by a short harness and of facilitating wiring work.

Another object of the present invention is to provide an all-terrain vehicle with a gear transmission having a transmission case of a comparatively small width and a comparatively short length regardless of being additionally provided with a reverse idle shaft as an intermediate shaft, having simple construction and capable of being assembled by assembling work not requiring much time and great effort.

According to the present invention, an all-terrain vehicle comprises: a variable-speed V-belt drive disposed on one side of a crankcase of an engine; a V-belt drive cover covering the variable-speed V-belt drive; a gear transmission of transmitting a power of the engine in cooperation with the variable-speed V-belt drive; and a speed sensing device including a speed sensor of measuring a rotating speed of a member which transmits the power of the engine to the wheels, the speed sensor being disposed right under the V-belt drive cover.

The speed sensor can be protected from mud and flying stones by the V-belt drive cover and any special protective cover is unnecessary. The speed sensor is disposed nearer to a speed indicator held on a handlebar or the like than the conventional speed sensor attached to the rear reduction gear case, so that the speed sensor can be connected to the speed indicator by a comparatively short harness, therefore, wiring work is facilitated and the harness can be easily protected.

Preferably, the speed sensor measures a rotating speed of a drive shaft which is extended in a back-and-forth direction from an output portion of the gear transmission.

Thus, the speed sensor can be easily attached to a lower part of the V-belt drive cover.

Preferably, the speed sensor is disposed opposite to a driven bevel gear mounted on the drive shaft and engaged with a drive bevel gear of the gear transmission.

Thus, the rotating speed of the driven bevel gear can be directly measured and hence any special member, such as a rotor for speed measurement, is unnecessary and the speed of the vehicle can be measured only by disposing the speed sensor opposite to the driven bevel gear.

Preferably, the speed sensing device further includes: a harness connecting part extending rearward from the speed sensor, and a harness having one end connected to a speed indicator of the all-terrain vehicle, the harness being extended along a component member, which is positioned behind the gear transmission, of a body frame of the all-terrain vehicle to the harness connecting part.

Thus, the harness extending between the speed sensor and the speed indicator can be firmly held on the body frame and can be guided without using any special holding member.

According to the present invention, an all-terrain vehicle comprises: an engine including a crankshaft and a crankcase; a gear transmission of transmitting a power of the engine; and
a transmission case containing the gear transmission. The gear transmission includes: a transmission input shaft having forward gears and a reverse gear, a transmission output shaft and a transmission intermediate shaft all of which are disposed in and supported on the transmission case in parallel to the crankshaft; and a dog clutch mechanism disposed on the transmission input shaft so that one of two forward ratios, a neutral state and a reverse ratio is established by moving a single shift sleeve. The transmission intermediate shaft includes a counter shaft having forward intermediate gears respectively engaged with the forward gears of the transmission input shaft, and a reverse idle shaft having a reverse idle gear engaged with the reverse gear of the transmission input shaft. The transmission input shaft and the transmission output shaft are spaced vertically in the transmission case. The counter shaft is disposed on one side nearer to the crankshaft with respect to a plane including respective center axes of the transmission input shaft and the transmission output shaft. The reverse idle shaft is disposed on other side farther from the crankshaft with respect to the plane.

Thus, while the gear transmission is capable of withstanding a large torque, the transmission case can be formed in a width smaller than that of a transmission case included in a conventional chain type transmission. Since the all-terrain vehicle is of a straddle type, the reduction of the width of the transmission case is effective in increasing spaces for rider's legs and in improving riding comfort.

Since the transmission input shaft and the transmission output shaft are spaced vertically, and the dog clutch mechanism can be operated by shifting the single shift sleeve to establish one of the two forward ratios, the neutral state and the reverse ratio, a wide space is available for disposing the intermediate shaft. Since the counter shaft is disposed on the side of the crankshaft (front side) and the idle shaft is disposed on the side farther from the crankshaft (rear side), a space under the transmission input shaft and a space in the transmission case between the crankshaft and the transmission input shaft can be efficiently used. Thus, although the gear transmission is provided with one additional shaft as compared with a conventional chain type transmission, the gear transmission is simple in construction and has a comparatively short length.

Preferably, the counter shaft further includes an intermediate output gear. The reverse idle gear includes a first reverse idle gear engaged with the reverse gear of the transmission input shaft, and a second reverse idle gear engaged with the intermediate output gear of the counter shaft. The first and the second reverse idle gears are disposed on one axial end side of the reverse idle shaft.

Thus, a high reduction ratio can be obtained without using a large reverse reduction gear and a large sprocket, and hence the transmission case can be formed in a short length. Since both the two reverse idle gears are disposed on one side with respect to the width of the transmission case, both the two reverse idle gears are disposed near a bearing supporting the reverse idle shaft. Therefore, the operation of the two reverse idle gears are scarcely affected by the bending of the reverse idle shaft, and the accurate engagement of the reverse idle gears with the corresponding gears can be maintained. The ease of incorporating the reverse idle gears into the gear transmission can be improved.

Preferably, the reverse idle shaft is supported on side walls of the transmission case which are opposite to opposite ends of the reverse idle shaft. One end part of the reverse idle shaft, on which the first and the second reverse idle gears are not mounted, is reduced in a diameter smaller than a diameter of other end part of the reverse idle shaft where the first and the second reverse idle gears are mounted.

Thus, the counter shaft and the reverse idle shaft can be disposed at a short center distance by, for example, positioning the outer circumference of the intermediate gear for the forward low ratio, of which diameter is the largest of those of the gears mounted on the countershaft, close to the reduced end part of the reverse idle shaft.

BRIEF DESCRIPTION OF THE DRAWINGS

The above and other objects, features and advantages of the present invention will become more apparent form the following description taken in connection with the accompanying drawings, in which.

DESCRIPTION OF THE PREFERRED EMBODIMENTS

Figure 1:
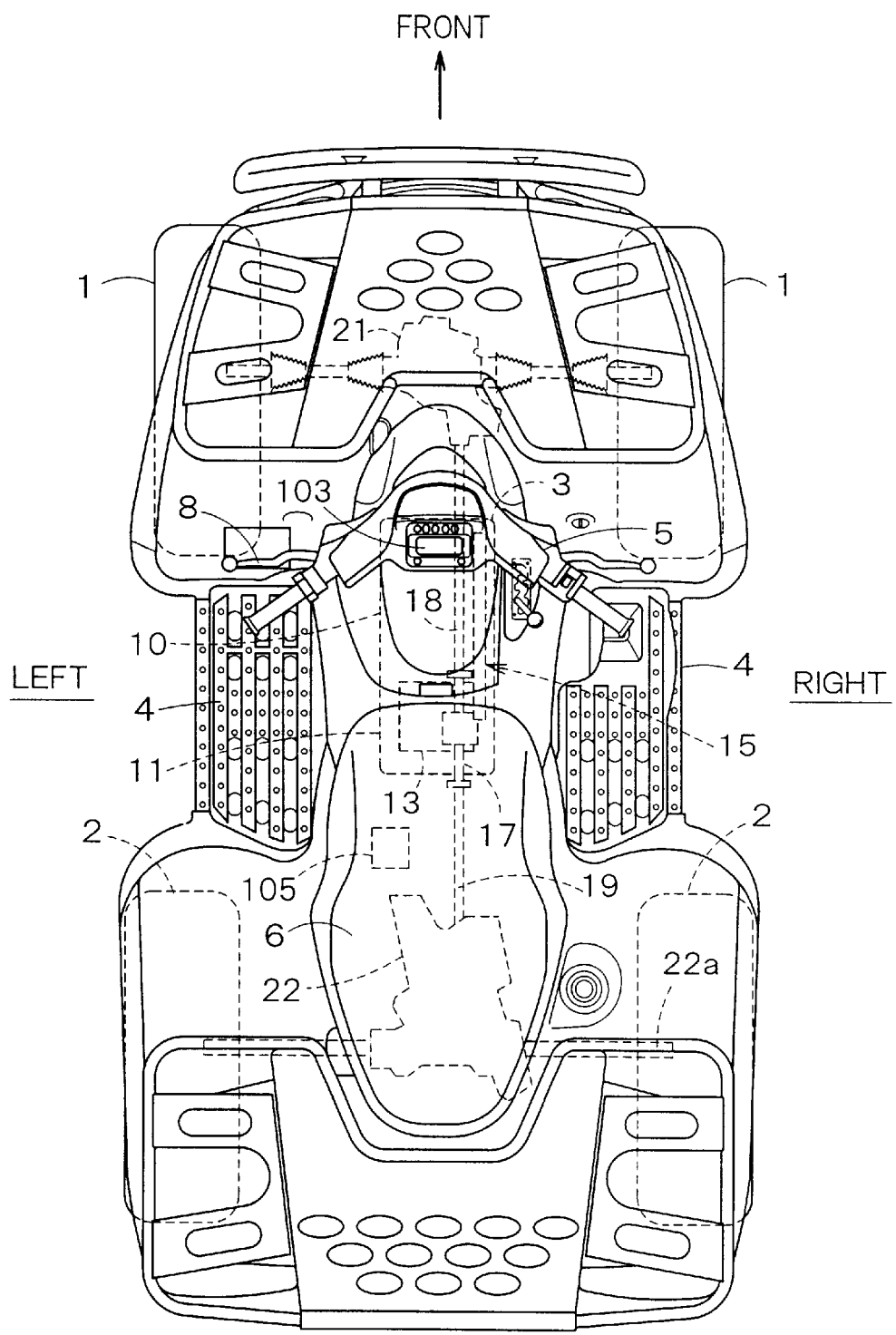
FIG. 1 is a plan view of an all-terrain vehicle according to an embodiment of the present invention.

An all-terrain vehicle with a speed sensing device in a preferred embodiment according to the present invention will be described. In the following description, the terms "right", "left", "front", "rear" and the like generally signify positional and directional attributes with respect to the direction of forward travel of the all-terrain vehicle.

Construction of a straddle-type four-wheeled all-terrain vehicle provided with a speed sensing device in a preferred embodiment according to the present invention and a power train for the four-wheeled all-terrain vehicle will be briefly described with reference to FIG. 1. The four-wheeled all-terrain vehicle has a body frame, a pair of front wheels 1 and a pair of rear wheels 2 supported on the body frame, an engine 3 mounted on a part of the body frame between the front wheels 1 and the rear wheels 2, and steps 4 disposed on the right and the left side of the engine 3, respectively. A handlebar 5 is supported on an upper part of the body frame, and a straddle-type seat 6 is disposed behind the handlebar 5. A speed meter (speed indicating device) 103 is held on a middle part of the handlebar 5. Levers including a brake lever 8 are disposed near the grips of the handlebar 5.

A crankcase 10 included in the engine 3 extends rearward, and a transmission case 11 is joined to the rear end of the crankcase 10. A gear transmission 13 is built in the transmission case 11. A variable-speed V-belt drive 15 is disposed on the right side of the crankcase 10. The output power of the engine 3 is transmitted through the variable-speed V-belt drive 15 to the gear transmission 13.

A drive shaft 17 is extended in the back-and-forth direction under the transmission case 11. The drive shaft 17 has a front end connected to a front propeller shaft 18, and a rear end connected to a rear propeller shaft 19. The front propeller shaft 18 has a front end part interlocked with a front reduction gear built in a front reduction gear case 21. The rear propeller shaft has a rear end part interlocked with a rear reduction gear built in a rear reduction gear case 22.

Figure 2:
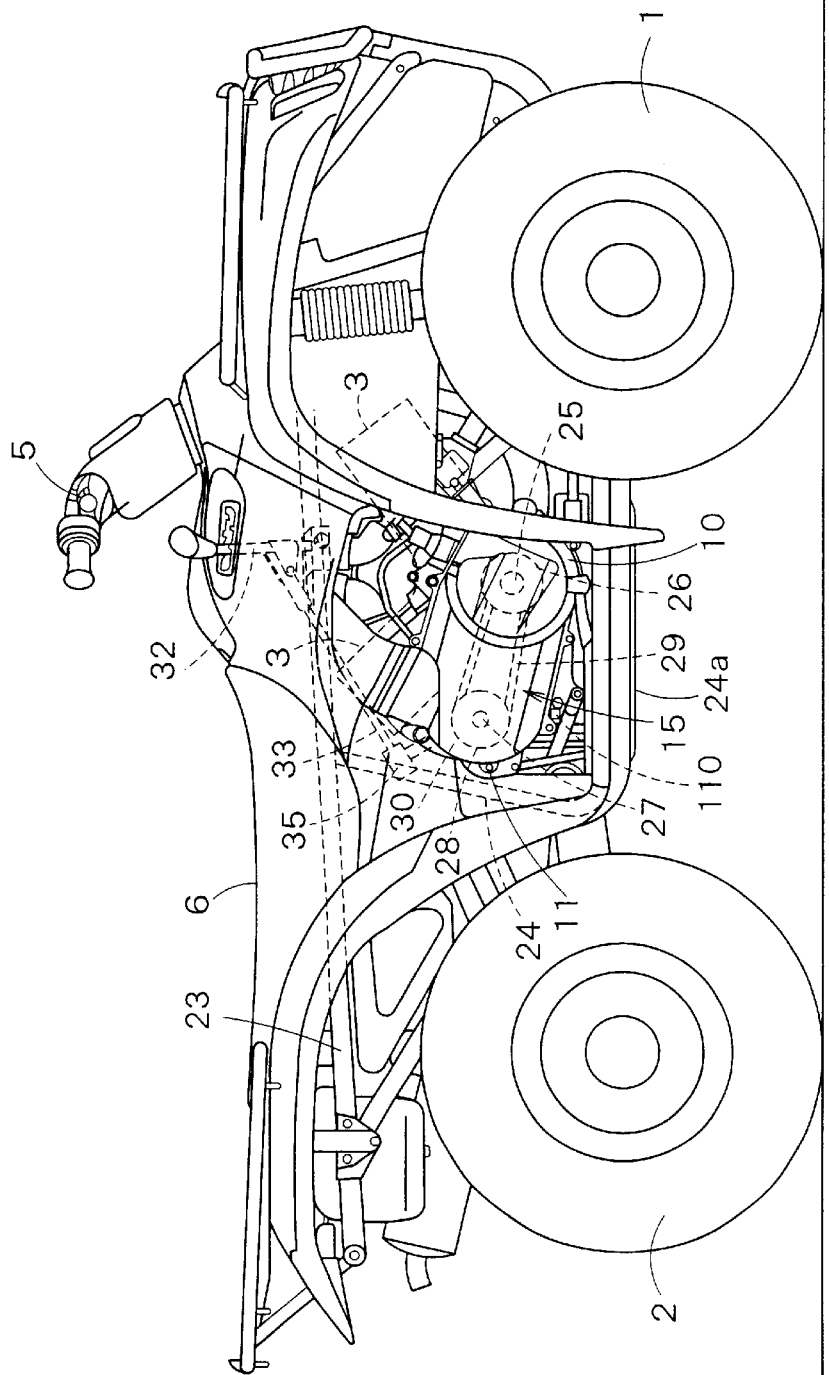
FIG. 2 is a side elevation of the all-terrain vehicle shown in FIG. 1.

Referring to FIG. 2, the engine 3 is a two-cylinder v-engine. Rising pipes 24, i.e., component members of the body frame, extend upward from rear end parts of lower pipes 24a in the vicinity of the rear end of the transmission case 11. Upper ends of the rising pipes 24 are welded to right and left upper pipes 23 which extend in the back-and-forth direction along the substantially whole length of the vehicle. The variable-speed V-belt drive 15 has a drive pulley 26 on the front side, a driven pulley 28 on the rear side, and a V belt 29 extended between the pulleys 26 and 28. A V-belt drive cover 30 is detachably attached to the right side wall of the crankcase 11 so as to cover the variable-speed V-belt drive 15.

A shift lever 32 is disposed below a right end part of the handlebar 5 and is connected to an external change lever 35 disposed in an upper end part of the transmission case 11 by a connecting rod 33.

[Variable-Speed V-Belt Drive]

Figure 4:
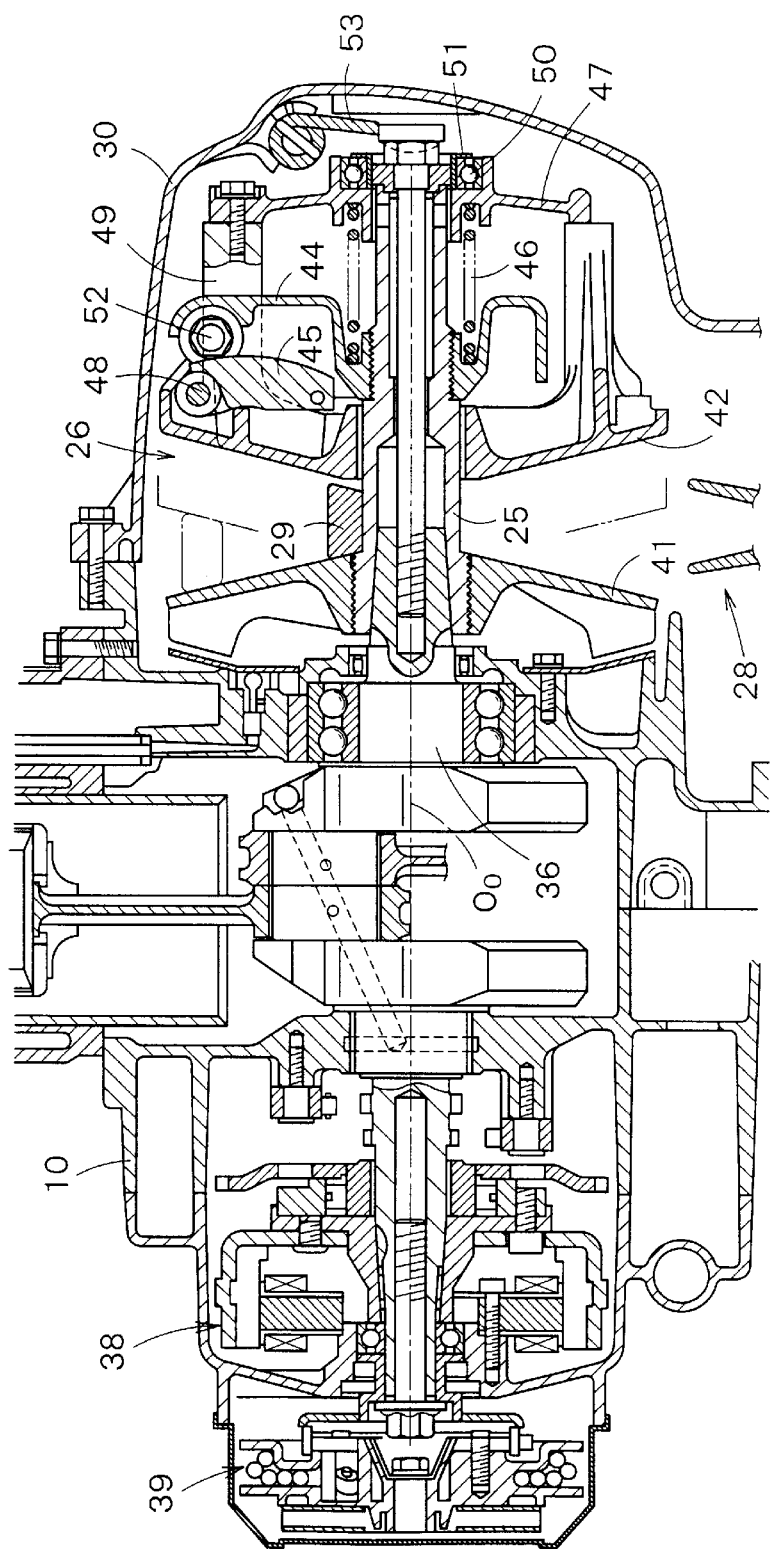
FIG. 4 is a sectional view of a part of a crankshaft and parts associated with the crankshaft in a plane including the axis of the crankshaft.

Referring to FIG. 4 showing a crankshaft 36 and associated parts in a sectional view in a plane including the axis $O_0$ of the crankshaft 36, a drive shaft 25 holding the drive pulley 26 thereon is joined to a right end part of the crankshaft 36 coaxially with the crankshaft 36. A generator 38 and a recoil starter 39 are mounted on a left end part of the crankshaft 36. The drive pulley 26 has a fixed sheave 41 and a movable sheave 42 disposed axially opposite to the fixed sheave 41. The fixed sheave 41 is fixedly-mounted on the drive shaft 25 and is restrained from turning and axial movement relative to the drive shaft 25. The movable sheave 42 is connected to the drive shaft 25 by a spider 44 for rotation together with the drive shaft 25 and is axially movable on the drive shaft 25.

A thrust mechanism including the spider 44, a plurality of flyweights 45, a pressure spring 46, and a support plate 47 is disposed on the back surface of the movable sheave 42. The flyweights 45 are supported pivotally by pins 48 on the back side of the movable sheave 42. As engine speed increases, the flyweights 45 turn away from the back surface of the movable sheave 42 on the pins 48. Connecting arms 49 extend to the right from the back surface of the movable sheave 42 through the spider 44, and the support plate 47 is fastened to the right ends of the connecting arms 49. The support plate 47 is mounted axially slidably on the drive shaft 25. A bearing 50 is fitted in a central boss formed on the support plate 47. A flanged collar 51 is fitted in the inner race of the bearing 50. An engine brake control lever 53 is in contact with the flange of the flanged collar 51.

The spider 44 is disposed on the right side of the movable sheave 42 and is screwed on the drive shaft 25. The spider 44 is provided with pressure-receiving rollers 52 in contact with the flyweights 45, respectively. The pressure spring 46 is compressed between the spider 44 and the support plate 47 so as to bias the support plate 47 to the right to bias the movable sheave 42 to the right indirectly through the connecting arms 49. Thus, the pressure spring 46 biases the movable sheave 42 of the drive pulley 26 away from the fixed sheave 41 of the same. When the flyweights 45 turn away from the back surface of the movable sheave 42 as engine speed increases, the movable sheave 42 is moved to the left together with the support plate 47 against the resilience of the pressure spring 46 by reaction force acting on the pressure-receiving rollers 52 to compress the V belt 29 between the parts 41 and 42 of the drive pulley 26.

Figure 5:
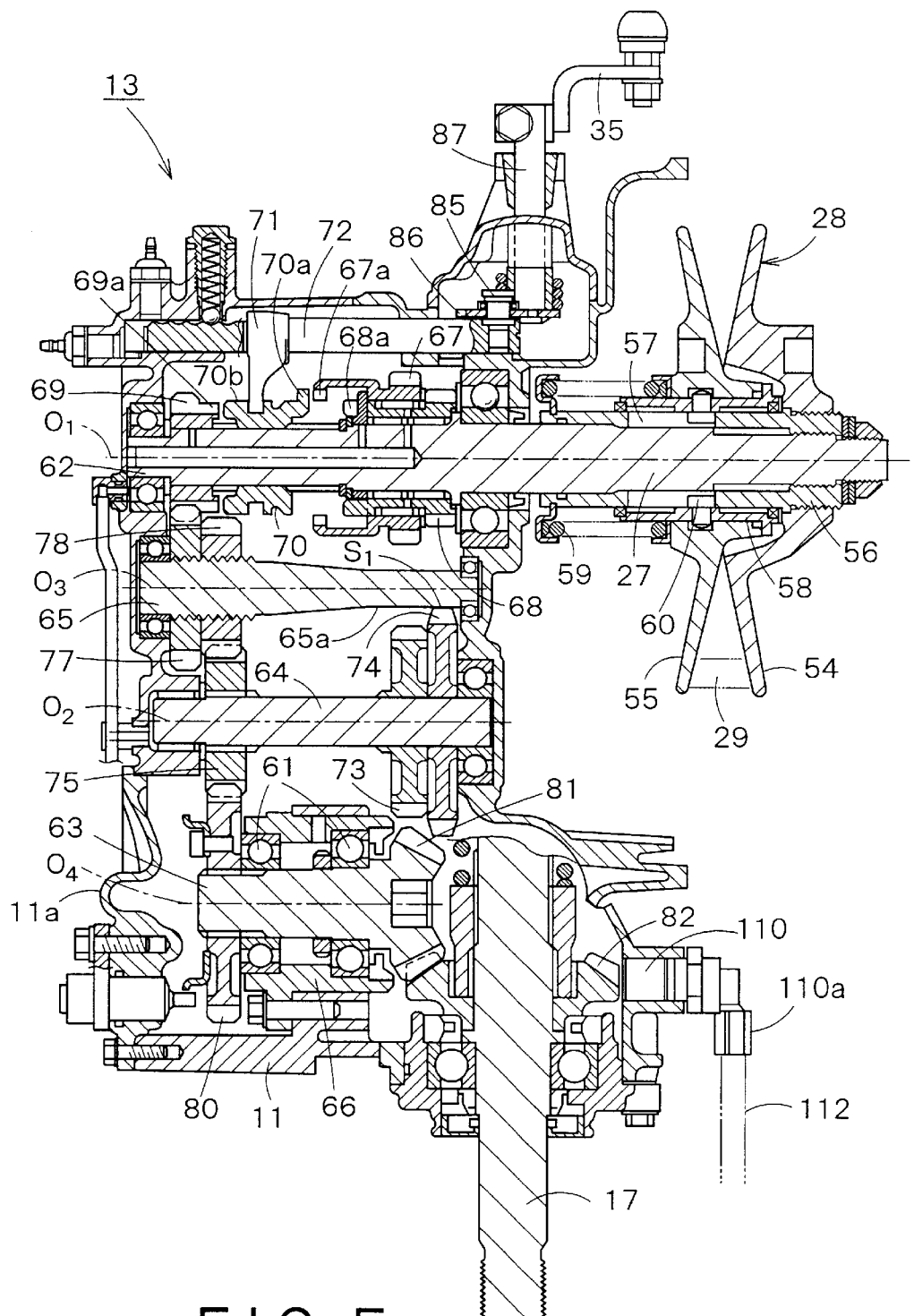
FIG. 5 is a sectional development of a gear transmission of the all-terrain vehicle shown in FIG. 1 in planes including the respective axes of shafts disposed in a transmission case.

Referring to FIG. 5, the driven pulley 28 of the variable-speed V-belt drive 15 has a fixed sheave 54 fixedly mounted on a cylindrical cam shaft 56, and a movable sheave 55 disposed on the left side of the fixed sheave 54 axially opposite to the same. A cylindrical cam shaft 56 is fixedly mounted on a driven shaft 27. The fixed sheave 54 is fixedly mounted on the cylindrical cam shaft 56 and is restrained from rotation and axial movement relative to the cylindrical cam shaft 56. The cylindrical cam shaft 56 is provided with spiral cam grooves 57. A sleeve 58 is fixedly fitted in the bore of the movable sheave 55. The sleeve 58 is put on the cylindrical cam shaft 56 so as to be rotatable and axially movable relative to the cylindrical cam shaft 56. The movable sheave 55 is biased toward the fixed sheave 54 by a pressure spring 59. Follower rollers 60 supported on the sleeve 58 are engaged slidably in the cam grooves 57.

As a torque transmitted by the V belt 29 to the driven pulley 28 increases, the movable sheave 55 is turned in the rotating direction of the driven pulley 28. Consequently, the action of the cam grooves 57 on the follower rollers 60 causes the movable sheave 55 to move toward the fixed sheave 54.

[Gear Transmission and Shift Mechanism]

Figure 6:
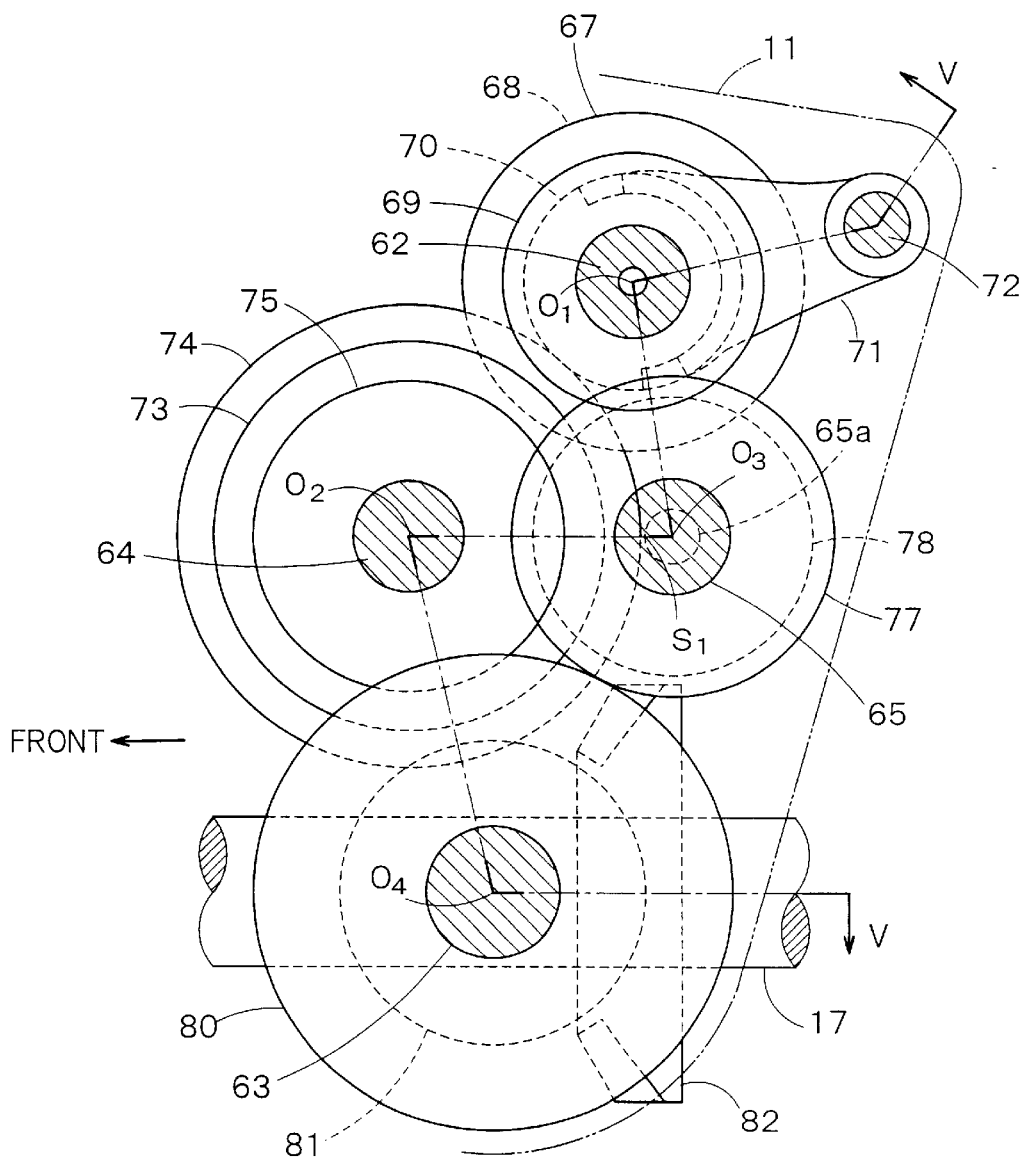
FIG. 6 is a vertical sectional left side view of assistance in explaining the arrangement of transmission shafts in the transmission case.

Referring to FIG. 6, a transmission input shaft 62 having an axis $O_1$ is extended laterally in an upper region in the transmission case 11 formed integrally with the crankcase 10. A transmission output shaft 63 having an axis $O_4$ is extended in parallel to the input shaft 62 in a lower end region in the transmission case 11. A counter shaft 64 having an axis $O_2$ and a reverse idle shaft 65 having an axis $O_3$ are disposed in parallel to the input shaft 62 on the front and the rear side with respect to a plane including the respective axes $O_1$ and $O_4$ of the input shaft 62 and the output shaft 63, respectively. The counter shaft 64 and the reverse idle shaft 65 are substantially at the same level. A shift rod 72 is disposed in parallel to the input shaft 62 at a position obliquely above and behind the input shaft 62. The counter shaft 64 supporting a forward low-speed intermediate gear 74 having the greatest diameter of those of gears included in the gear transmission 13 is disposed in a front region in the transmission case 11, where a comparatively large space is available, and the reverse idle shaft 65 is disposed in a rear region in the transmission case 11. Therefore, the rear end wall of the transmission case 11 does not need to be bulged rearward. The drive shaft 17 and the output shaft 63 are at substantially the same level.

FIG. 5 is a sectional development taken on line V—V passing the axes $O_1$, $O_2$, $O_3$ and $O_4$ in FIG. 6. The transmission input shaft 62 is formed integrally with the driven shaft 27 supporting the driven pulley 28 thereon. The opposite ends of the transmission input shaft 62, the counter shaft 64 and the reverse idle shaft 65 are supported in bearings on the right and the left side wall of the transmission case 11. The transmission output shaft 63 is shorter than the other shafts 62, 64 and 65 and is supported in a pair of bearings 61 mounted on a shaft holder 66 fixedly disposed in the transmission case 11. The drive shaft 17 is disposed on the right side of the transmission output shaft 63.

A forward high-speed gear 67 and a forward low-speed gear 68 are mounted contiguously on a right end part of the transmission input shaft 62, and a reverse gear 69 is mounted on a left end part of the transmission input shaft 62. A single shift sleeve 70, which is a component of a shift dog clutch mechanism for establishing one of two forward ratios, a neutral state and a reverse ratio, is mounted on and splined to a middle part of the transmission input shaft 62. The shift sleeve 70 is axially movable on the transmission input shaft 62.

The reverse gear 69 is provided on its right end surface with projections 69a and is supported for rotation by a needle bearing on the transmission input shaft 62. The forward low-speed gear 68 has a boss extending to the left from its left end surface and projections 68a are formed in the left end surface of the boss of the forward low-speed gear 68. The boss of the forward low-speed gear 68 is supported for rotation by a needle bearing on the input shaft 62. The forward high-speed gear 67 has arms extending to the left and provided at their extremities with projections 67a, and is supported for rotation by a needle bearing on the boss of the forward low-speed gear 68. Forward projections 70a and reverse projections 70b are formed in the right and the left end surface of the shift sleeve 70, respectively.

The axial interval between the respective projections 67a and 68a of the forward high-speed gear 67 and the forward low-speed gear 68 is determined such that the forward projections 70a of the shift sleeve 70 are able to move via a neutral position between the projections 67a and 68a.

A single shift fork 71 is engaged in an annular groove formed in the outer circumference of the shift sleeve 70. The shift fork 71 is fixed to the shift rod 72 supported for axial movement on the transmission case 11. When the shift sleeve 70 is shifted to the left from the neutral position for a neutral state shown in FIG. 5, the reverse projections 70b of the shift sleeve 70 and the projections 69a of the reverse gear 69 are engaged. When the shift sleeve 70 is shifted to the right from the neutral position, the forward projections 70a of the shift sleeve 70 are engaged with the projections 67a of the forward high-speed gear 67. When the shift sleeve 70 is shifted further to the right, the forward projections 70a moves via the neutral position and are engaged with the projections 68a of the forward low-speed gear 68. Thus, the gear transmission can be selectively set in one of the four gear ratios, i.e., the forward high-speed ratio, the forward low-speed ratio, the neutral state and the reverse ratio by operating the single shift fork 71.

A change pin 85 projects upward from a right end part of the shift rod 72, and an internal change lever 86 is engaged with the change pin 85 and is connected to the external change lever 35 by a change lever shaft 87.

A forward intermediate gear 73 and the forward intermediate gear 74 are fixedly mounted on a right end part of the counter shaft 64 and are engaged with the forward high-speed gear 67 and the forward low-speed gear 68, respectively. An intermediate output gear 75 is fixedly mounted on a left end part of the counter shaft 64.

A first reverse idle gear 77 of a large diameter and a second reverse idle gear 78 of a small diameter are fixedly mounted on a left end part of the reverse idle shaft 65 and are engaged with the reverse gear 69 and the intermediate output gear 75, respectively. The diameter of a right half part 65a of the reverse idle shaft 65 is smaller than that of the left half part of the same. The counter shaft 64 and the reverse idle shaft 65 are disposed as close to each other as possible so that only a very small gap S1 is formed between the circumference of the forward low-speed intermediate gear 74 having the greatest diameter of those of the gears on the counter shaft 64 and the surface of the right half part 65a having the small diameter of the reverse idle shaft 65; that is the counter shaft 64 and the reverse idle shaft 65 are disposed at the shortest possible center distance.

The intermediate output gear 75 is engaged with an output gear 80 fixedly mounted on a left end part of the output shaft 63. A drive bevel gear 81 formed integrally with a right end part of output shaft 63 is engaged with a driven bevel gear 82 fixedly mounted on the drive shaft 17.

[Speed Sensing Device]

Figure 3:
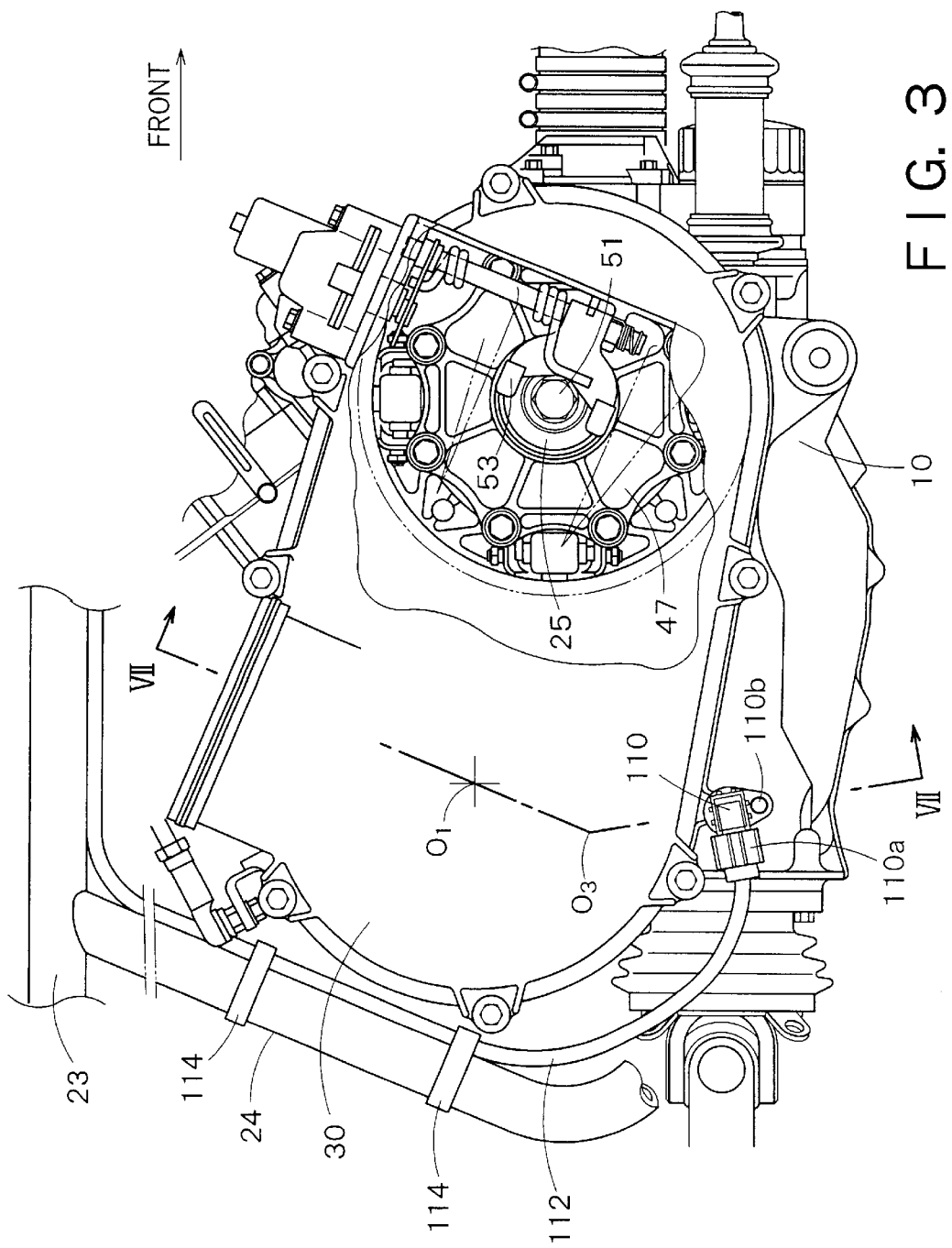
FIG. 3 is a partly cutaway side elevation of a transmission case and a V-belt drive cover.

Referring to FIG. 3 showing the right side surfaces of the crankcase 10 and the V-belt drive cover 30, a speed sensor 110 is disposed under a rear part of the V-belt drive cover 30, i.e., right under a driven pulley covering part. A harness connector 110a is formed integrally with and extends rearward from the speed sensor 110. A modular jack connected to a harness 112 is detachably connected to the harness connector 110a. A part of the harness 112 near the harness connector 110a is curved gradually so as to extend gently upward, and the harness 112 is held by bands 114 on the rising pipe 24 of the body frame so as to extend upward along the rising pipe 24. The harness 112 is extended forward from the upper end of the rising pipe 24 along the upper pipe 23 of the body frame to the speed meter 103 shown in FIG. 1.

Figure 7:
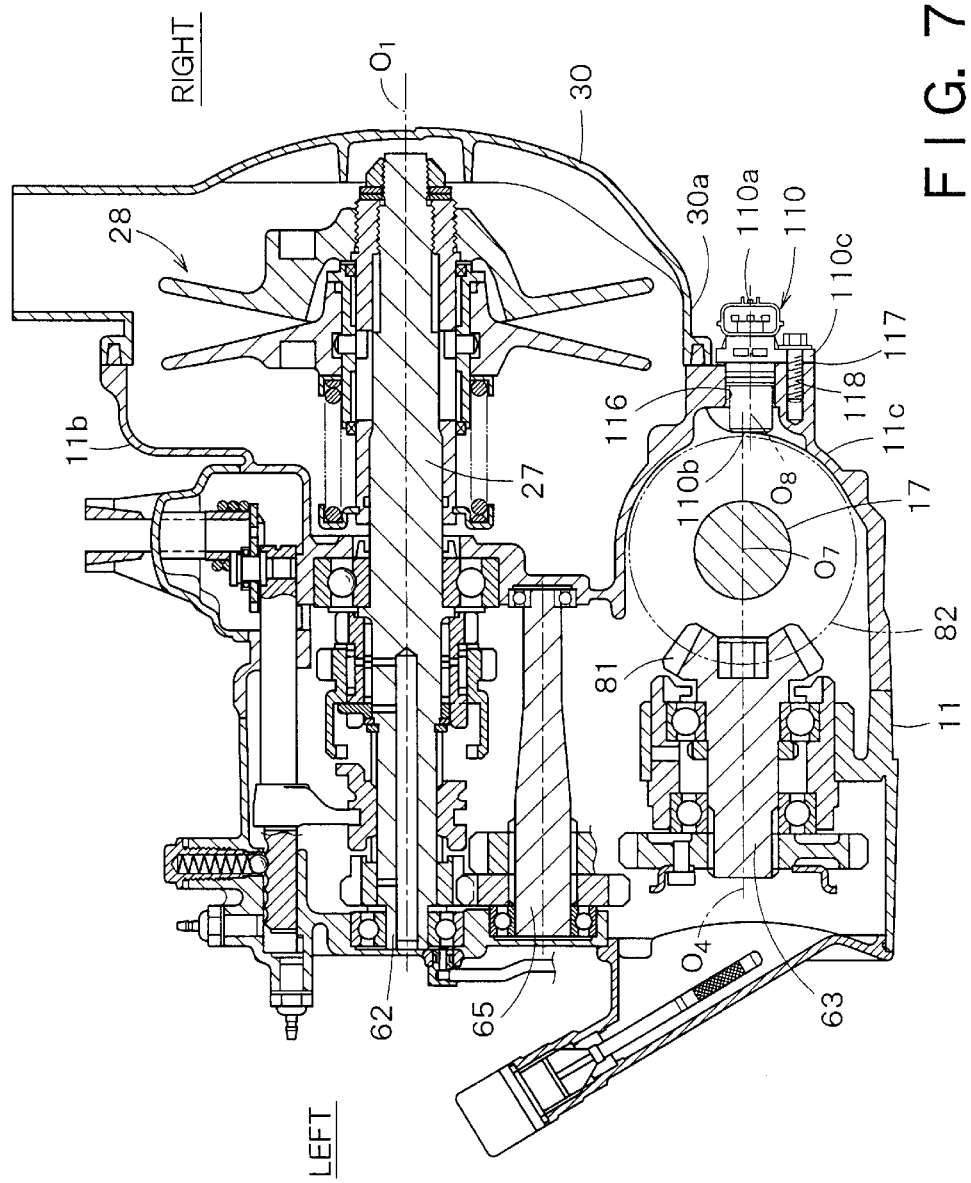
FIG. 7 is a sectional view taken on line VII—VII in FIG. 3.
Figure 8:
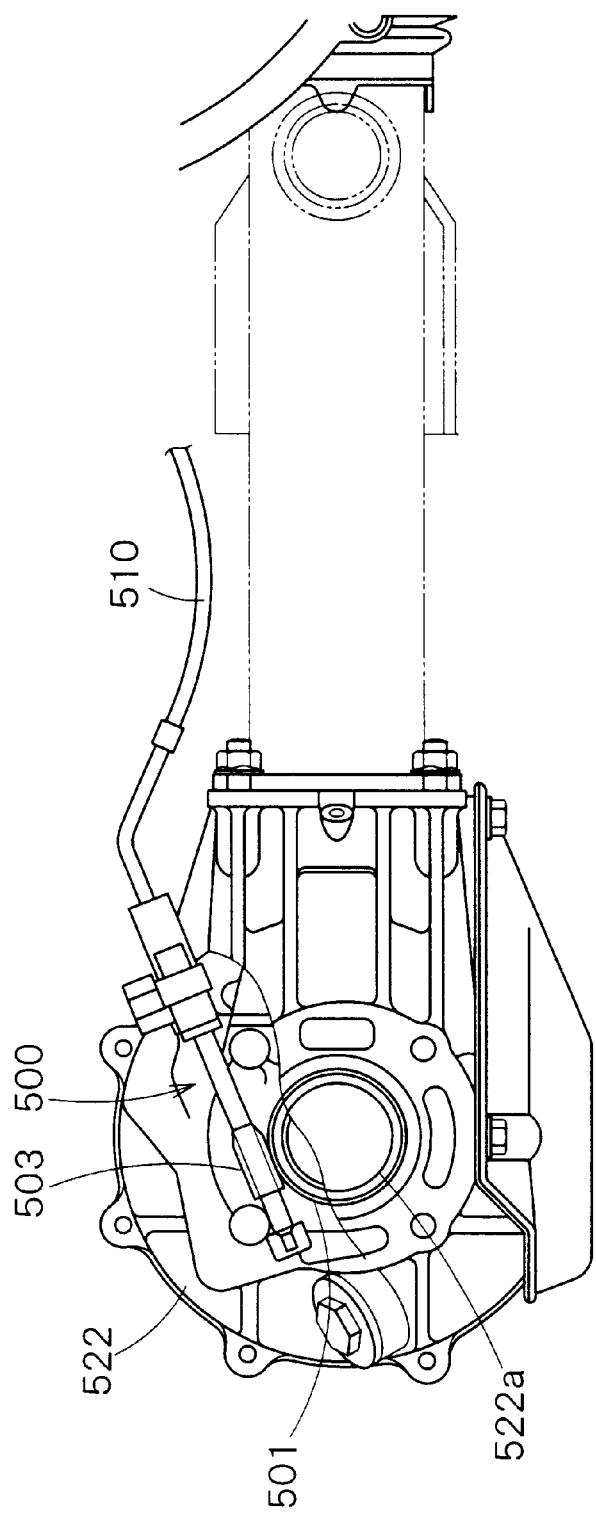
FIG. 8 is a side elevation of a related art.
Figure 9:
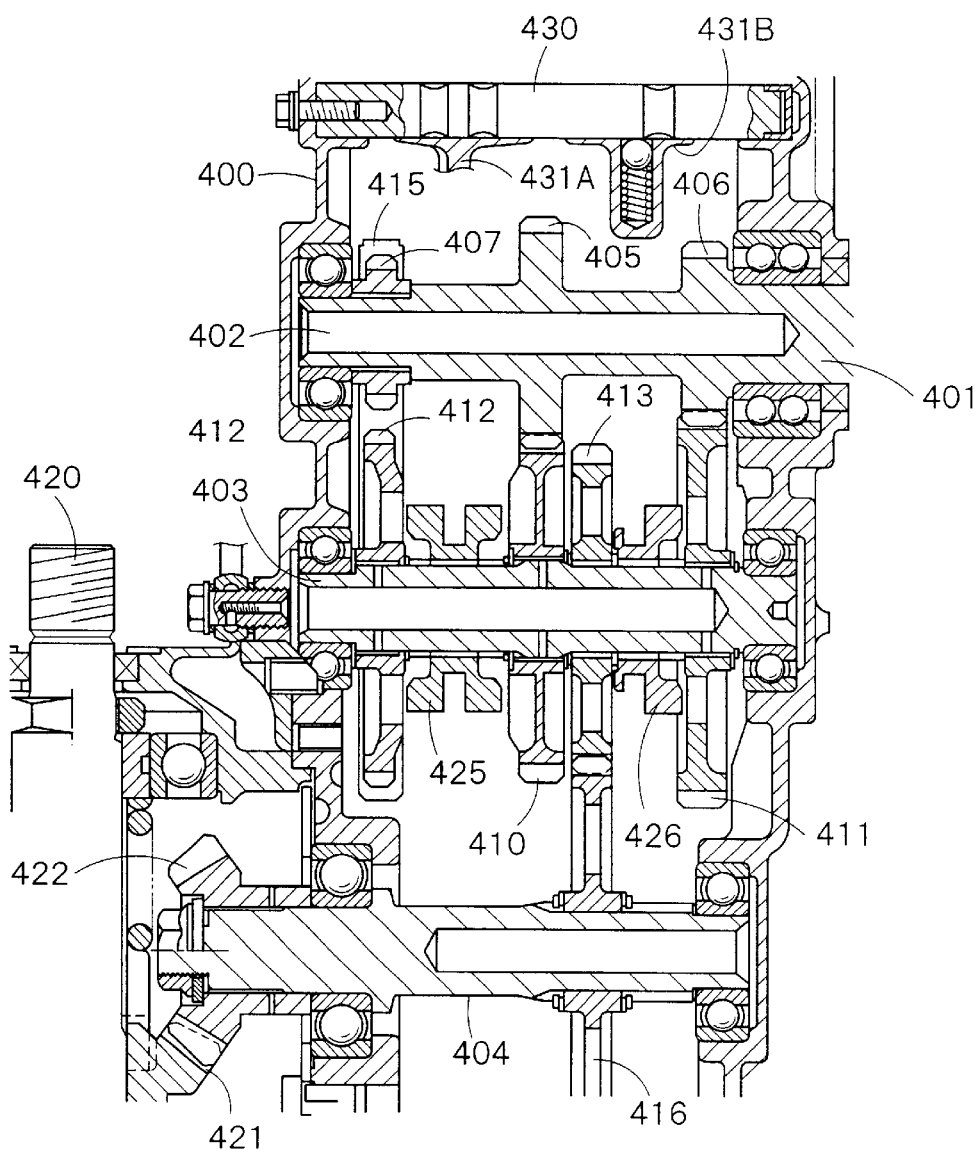
FIG. 9 is a sectional development of a related art in planes including the respective axes of transmission shafts.

FIG. 7 is an enlarged sectional view taken on line VII—VII in FIG. 3. Referring to FIG. 7, a V-belt drive case 11b is formed integrally with the right side wall of the transmission case 11, and the V-belt drive cover 30 is joined to the right end surface of the V-belt drive case 11b with a gasket held between the V-belt drive case 11b and the V-belt drive cover 30. A right end part 11c of the right side wall of the transmission case 11 corresponding to the driven bevel gear 82 is formed in a semicylindrical shape conforming to the shape of the driven bevel gear 82. A speed sensor mounting hole 116 is formed in the right end part 11c. The center axis $O_8$ of the speed sensor mounting hole 116 is at a level slightly below that of the axis $O_7$ of the driven bevel gear 82.

The speed sensor 110 is inserted in the speed sensor mounting hole 116 from the right side so that a flange 110c formed integrally with the speed sensor 110 is seated on a seat 117 formed in the right end surface of the right end part 11c. The flange 110c is fastened to the right end part 11c with bolts 118. When the speed sensor 110 is thus set in place, a detecting surface 110b thereof is closely opposite to the circumference of the driven bevel gear 82. The speed sensor 110 is disposed right under the lower wall 30a of the V-belt drive cover 30 and is completely included in a plane region defined by the lower wall 30a of the V-belt drive cover 30 when seen from the upper side. The speed sensor 110 is disposed as close to the lower wall 30a of the V-belt drive cover 30 as possible.

The speed sensor 110 is electric. A toothed part of the driven bevel gear 82 is used as a speed measuring rotor. The speed sensor 110 detects the teeth of the driven bevel gear 82, generates an electric pulse signal representing the rotating speed of the driven bevel gear 82 and provides the electric pulse signal on the harness 112.

[Operation]

Referring to FIG. 1, the output torque of the engine 3 is transmitted through the variable-speed V-belt drive 15, the gear transmission 13, the drive shaft 17, the propeller shafts 18 and 19 and the front and the rear reduction gear to the front wheels 1 and the rear wheels 2.

The shift lever 32 shown in FIG. 2 is operated by hand to turn the internal change lever 86 through the connecting rod 33, the external change lever 35 shown in FIG. 5 and the change lever shaft 87 to shift the shift rod by the change lever pin 85 to set the gear transmission 13 in one of the two forward ratios, the neutral state and the reverse ratio.

Referring to FIGS. 5 and 6, when the gear transmission 13 is set in the forward high-speed ratio by shifting the shift sleeve 70 from the neutral position to the right to engage the forward projections 70a with the projections 67a of the forward high-speed gear 67, the torque applied to the input shaft 62 is transmitted through the forward high-speed gear 67, the forward high-speed intermediate gear 73, the counter shaft 64, the intermediate output gear 75 and the output gear 80 to the output shaft 63 to rotate the output shaft 63 in a forward-driving direction. Consequently, the drive shaft 17 is driven through the bevel gears 81 and 82 for rotation in a forward-driving direction.

When the gear transmission 13 is set in the forward low-speed ratio by shifting the shift sleeve 70 from the neutral position to the right to engage the forward projections 70a with the projections 68a of the forward low-speed gear 68, the torque applied to the input shaft 62 is transmitted through the forward low-speed gear 68, the forward low-speed intermediate gear 74, the counter shaft 64, the intermediate output gear 75 and the output gear 80 to the output shaft 63 to rotate the output shaft 63 in a forward-driving direction. Consequently, the drive shaft 17 is driven through the bevel gears 81 and 82 for rotation in a forward-driving direction.

When the gear transmission 13 is set in the reverse ratio by shifting the shift sleeve 70 from the neutral position to the left to engage the reverse projections 70b with the projections 69 of the reverse gear 69, the torque applied to the input shaft 62 is transmitted through the reverse gear 69, the first reverse idle gear 77, the reverse idle shaft 65, the second reverse idle gear 78, the intermediate output gear 75 and the output gear 80 to the output shaft 63 to drive the output shaft 63 for rotation in a reverse-driving direction. Consequently, the drive shaft 17 is driven through the bevel gears 81 and 82 for rotation in a reverse-driving direction. The reverse power transmission train has three reduction gear sets that reduce rotating speed, i.e., the set of the reverse gear 69 and the first reverse idle gear 77, the set of the second reverse idle gear 78 and the intermediate output gear 75, and the set of the intermediate output gear 75 and the output gear 80. The number of the reduction gear sets of the gear transmission 13 is greater than that of the reduction gear sets of a conventional chain transmission by one. Since the first reverse idle gear 77 and the second reverse idle gear 78 have different diameters, respectively, the reverse power transmission train is able to reduce the input speed at a high reduction ratio without using a reverse idle gear having a very large diameter.

In a modification, a right half part of the reverse idle shaft 65 shown in FIG. 5 may be cut off and the diameter of the forward low-speed intermediate gear 74 may be further increased.

While the all-terrain vehicle is running, the speed sensor 110 shown in FIG. 7 measures electrically the rotating speed of the driven bevel gear 82 mounted on the drive shaft 17, and sends an electric speed signal representing the rotating speed of the driven bevel gear 82 through the harness 112 to the speed meter 103 shown in FIG. 1.

In a modification, a plate may be mounted on the drive shaft 17, and the speed sensor 110 may measure the rotating speed of the plate.

Although the invention has been described as applied to the gear transmission combined with a v-engine, present invention is applicable to gear transmissions to be used in combination with engines other than v-engines.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An all-terrain vehicle comprising:
   an engine including a crankshaft and a crankcase;

a gear transmission of transmitting a power of the engine; and a transmission case containing the gear transmission;

the gear transmission including:

a transmission input shaft having forward gears and a reverse gear, a transmission output shaft and a transmission intermediate shaft all of which are disposed in and supported on the transmission case in parallel to the crankshaft; and a dog clutch mechanism disposed on the transmission input shaft so that one of two forward ratios, a neutral state and a reverse ratio is established by moving a single shift sleeve;

wherein the transmission intermediate shaft includes a counter shaft having forward intermediate gears respectively engaged with the forward gears of the transmission input shaft, and a reverse idle shaft having a reverse idle gear engaged with the reverse gear of the transmission input shaft;

wherein the transmission input shaft and the transmission output shaft are spaced vertically in the transmission case;

wherein the counter shaft is disposed on one side nearer to the crankshaft with respect to a plane including respective center axes of the transmission input shaft and the transmission output shaft; and wherein the reverse idle shaft is disposed on other side farther from the crankshaft with respect to the plane.

2. The all-terrain vehicle according to claim 1, wherein the counter shaft further includes an intermediate output gear;

wherein the reverse idle gear includes a first reverse idle gear engaged with the reverse gear of the transmission input shaft, and a second reverse idle gear engaged with the intermediate output gear of the counter shaft; and wherein the first and the second reverse idle gears are disposed on one axial end side of the reverse idle shaft.

3. The all-terrain vehicle according to claim 2, wherein the reverse idle shaft is supported on side walls of the transmission case which are opposite to opposite ends of the reverse idle shaft; and wherein one end part of the reverse idle shaft, on which the first and the second reverse idle gears are not mounted, is reduced in a diameter smaller than a diameter of other end part of the reverse idle shaft where the first and the second reverse idle gears are mounted.

* * * * *